C. W. BARNES.
HOSE AND PIPE COUPLING.
APPLICATION FILED AUG. 17, 1918.

1,336,123.  Patented Apr. 6, 1920.

Charles W. Barnes
Inventor

UNITED STATES PATENT OFFICE.

CHARLES W. BARNES, OF PUYALLUP, WASHINGTON, ASSIGNOR OF ONE-FOURTH TO B. W. COINER, OF TACOMA, WASHINGTON.

HOSE AND PIPE COUPLING.

1,336,123.  Specification of Letters Patent.  Patented Apr. 6, 1920.

Application filed August 17, 1918. Serial No. 250,398.

*To all whom it may concern:*

Be it known that I, CHARLES W. BARNES, a citizen of the United States, residing at 121 6th avenue S. W., in the city of Puyallup, county of Pierce, and State of Washington, have invented a new and useful Improvement to and in Hose and Pipe Couplings, of which the following is a specification.

My invention relates to the introduction into any of the usually used hose and pipe couplings, and such as may hereafter be used, of a valve that will cut off and stop the flow of air, gas, steam or liquids under pressure, or otherwise, in the hose or pipe when the coupling is disconnected, and leave the full pressure or power on in the hose or pipe that is connected with the source of pressure or power, avoid the loss of air, gas, steam or liquid, avoid the loss of pressure or power in the hose or pipe from the break toward the source, and obviate the necessity of cutting off at the source in case of accidental or other disconnection or break in the line of pipe or hose, the valve being so arranged and operated that the act of coupling or uncoupling automatically opens or closes the valve, and thus opens or closes the line of pressure.

I attain these objects by the mechanism illustrated in the accompanying drawings in which—

Figure 4:
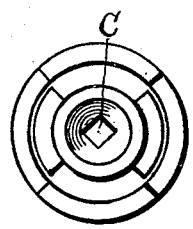
Figure 3:
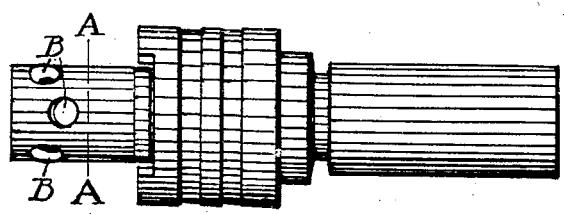
Figure 5:
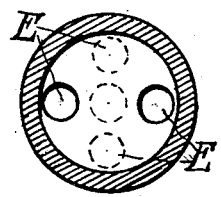
Figure 6:
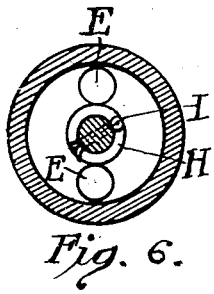

Fig. 3 is an exterior view of the male member of same coupling which has been elongated sufficiently to accomplish the desired purpose (in this case about ⅝ of an inch) as from A—A, Fig. 3; the end is closed except as to a square or other shaped hole (C. Fig. 4) left to act as a wrench on the valve stem of valve in the female member of the coupling when engaged, the part constituting the wrench having a multiple of holes (B. B. B. Fig. 3) thereinto permit the free passage of air or other content into the other member of coupling and on through the hose or pipe;

Fig. 4 is a left end view of Fig. 3;

Fig. 5 is a cross-section at 5—5 (Fig. 2) showing valve closed when male member is withdrawn;

Fig. 6 is a cross-section at 6—6 (Fig. 2), looking to the left, showing ports in union and valve open.

The male member is made of such length as will be required to reach over the valve stem and operate as a wrench to turn the valve in making or unmaking a coupling, and at the same time leave room to make the desired number of ports for the passage of the element flowing through the hose, and will depend on the make of the coupling of which it is a part.

The valve is inserted in the female member of coupling as follows:—There is cast in, or afterward inserted, in the hollow of the member a disk of about $\frac{3}{16}$ of an inch, or any desired thickness, with a multiple of holes for the passage of the element in the hose and another hole in the center through which the valve stem passes; this is the valve seat D Fig. 2.

Figure 1:
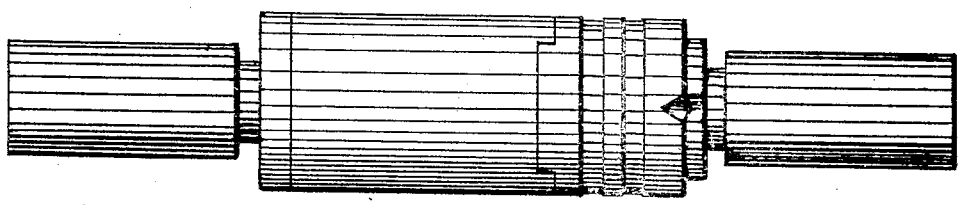
Figure 1 is a view of a Bowes hose coupling, last patented April 14, 1914, with female part lengthened sufficiently to receive my valve, and tapped at the hose end.
Figure 2:
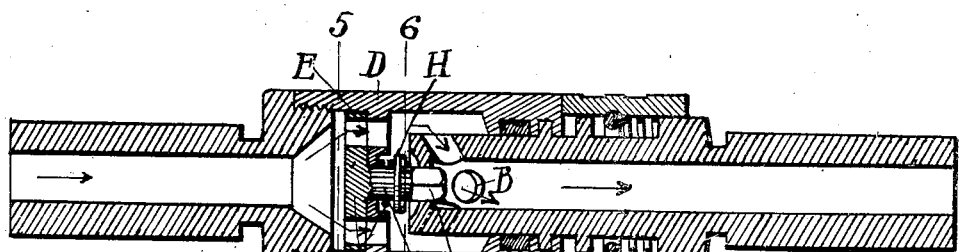
Fig. 2 is a lengthwise section of said coupling, through the center of same, with my invention inserted therein and added thereto.

This valve seat on the side toward the male member is bored around the valve stem hole to receive and hold a small spring E Fig. 2; the valve F and stem G are made in one or two pieces, preferably one; the stem G is inserted through the center of valve seat D, the spring E placed around it; a washer H is then placed around the valve stem and this is held in place by a cotter pin I (Fig. 6). The spring holds the valve always in close union with the valve seat and prevents the passage of anything when valve is closed. When a coupling is made the end of the male extension A—A Fig. 3 passes over the squared end of stem G and by a turn (which is a quarter turn in case of the Bowes coupling) the valve is at the same time and by the same act turned so that the holes in valve seat D and in valve F coincide and make a free passage way through the coupling and line of hose.

When the turn is made to uncouple that act turns the valve on its seat, closes the passage, and retains all power or pressure and all the element in the hose on the female side of the coupling, that member being on the side toward the source of pressure or power.

I am aware that prior to my invention many types of couplings have been devised, but I am not aware that any one has heretofore invented any means of instantly and automatically closing the hose or pipe under pressure by the mere act of uncoupling, or by the use of any such valve or wrench or the combination of the two, or in any manner at all similar to my invention.

I therefore broadly claim—

1. A pipe coupling of the class described embodying a coupling section, a transverse partition therein provided with apertures, a disk valve having openings therein rotatably mounted upon said partition, a stem carried by the valve extending through an opening in said partition and having flattened sides at its projecting end and a pipe adapted to extend into said section with the end thereof formed to engage the end of said stem to rotate the valve during coupling and uncoupling movement of the pipe to the section.

2. A pipe coupling of the class described embodying a coupling section, a transverse partition therein provided with apertures, a disk valve having openings therein rotatably mounted upon said partition, a stem carried by the valve extending through an opening in said partition and having a squared projecting end, a washer fixed to said stem inwardly of its squared end, a coil spring surrounding the stem between the washer and partition to hold the valve tightly against its seat at all times and a pipe section adapted to be connected to the coupling section and having a squared opening in its inner end to receive the squared end of the valve stem to open and close the valve simultaneously with the coupling and uncoupling of the pipe to said section.

CHARLES W. BARNES.